Patented Jan. 19, 1937

2,068,350

UNITED STATES PATENT OFFICE 2,068,350

PREPARATION OF DYESTUFFS OF THE ANTHRAQUINONE SERIES

William L. Rintelman, Carrollville, and William H. Lycan, South Milwaukee, Wis., assignors to E. I. du Pont de Nemours & Company, Wilmington, Del., a corporation of Delaware No Drawing. Application October 23, 1935, Serial No. 46,338

6 Claims. (Cl. 260—61)

This invention relates to the preparation of dyestuffs of the anthraquinone series, and more particularly to the preparation of bromination products of dimethoxy-dibenzanthrones.

In the bromination of dimethoxy-dibenzanthrone in concentrated sulfuric acid with subsequent drowning of the bromination mass to precipitate the dyestuff, it has been found that some demethylation takes place. The resulting dyestuff is therefore a mixture of the desired brominated dimethoxy-dibenzanthrone and what is believed to be a brominated hydroxy-dibenzanthrone. Separation of these two components shows that the dibromo-dimethoxy-dibenzanthrone when free from the demethylated product dyes cotton in much brighter shades than the unpurified product, and that it is much improved in its fastness to acids.

It is an object of this invention to provide a process for brominating dimethoxy-dibenzanthrone that will give a product that is essentially free from those impurities which render it sensitive to acid.

It is a further object to provide a method for isolating the brominated dimethoxy-dibenzanthrone from the concentrated sulfuric acid bromination solution which will avoid the demethylation that occurs in the usual drowning procedure, and which therefore gives increased yields of a product that dyes in brighter shades than are normally obtained without restort to special purification.

In the bromination of dimethoxy-dibenzanthrone an excess of bromine is ordinarily used and we have found that the demethylation of the desired product occurs at the time the bromination mass is diluted to precipitate the dyestuff, due to the free bromine that is present in the dilute acid solution. This demethylation can be materially reduced or entirely prevented by neutralizing the free bromine that still remains in the solution either prior to diluting or as fast as the mass is poured into the dilute acid or water. When the excess bromine is quantitatively removed before any dilution occurs, the product of the reaction is found to contain, if any, only negligible quantities of the demethylated material and yields superior shades on cotton without further purification. Any reagent with which bromine reacts readily and completely may be used to neutralize this free bromine, such as phenol, hexahydrophenol, hydroquinone, resorcinol, quinizarine, aniline, acetone, kerosene, sodium bisulfite, sodium sulfite, sulfur dioxide, etc. Such reagents as phenol, hexahydrophenol, hydroquinone, resorcinol, quinizarine, aniline, acetone or kerosene may be added directly to the concentrated acid solution prior to dilution. Where the neutralizing agents are added to the water or dilute acid into which the bromination mass is poured, water soluble compounds such as phenol, acetone, sodium bisulfite, sodium sulfite, sulfur dioxide, etc. should be used.

The following examples are given to more specifically illustrate our invention. The parts used are by weight.

Example 1

15 parts of dry dimethoxy-dibenzanthrone are dissolved at below 20° C. in 225 parts of sulfuric acid monohydrate. When the dyestuff is in solution, there are added 19.5 parts of bromine at such a rate that the temperature does not exceed 20° C. The charge is slowly agitated for 16 hours during which time it is allowed to come to room temperature. At this point, although the bromination is substantially complete, there remains a considerable excess of bromine. The charge is cooled to 10–15° C. and while maintained at this temperature 15 parts of phenol are added. The phenol reacts readily with the excess bromine and after about 30 minutes agitation, the bromine fumes completely disappear. The mass is now carefully diluted by the slow addition of dilute sulfuric acid or water until the acid concentration is below 90% in such a manner that the temperature does not exceed 15° C. The charge is then poured into 1500 parts of ice and water under good agitation and in such a manner that the temperature does not exceed 15° C. The resulting suspension is stirred one hour to insure complete dispersion of the dyestuff, and filtered. The residue is washed free from acid with cold water.

The dyestuff thus obtained is substantially purer in form than material similarly brominated but isolated in the usual manner. When dried and purified as in Example 1 of U. S. Patent 1,905,088, the product is not materially improved. The acid free residue may be converted directly to a dye paste which yields dyeings or prints characterized by greatly improved brightness and superior fastness to acids.

Example 2

54 parts of bromine and 0.44 part of iodine are added to 200 parts of monohydrate at below 20° C. 20 parts of dimethoxy-dibenzanthrone are dissolved in this suspension at 15–20° C. When the dyestuff is completely in solution, the charge is heated to 25–30° C. and agitated at this temperature for a period of 20–24 hours. It is now cooled to 20° C. and diluted by pouring slowly into a solution of 20 parts of sodium bisulfite in 1500 parts of ice and water. The temperature should be kept at below 5° C. during the dilution. The resulting suspension is agitated for one hour to insure complete dispersion of the dyestuff and is then filtered. The residue is washed free from acid with cold water.

The acid free residue is converted to a dye paste which yields dyeings of improved brightness and fastness to acid as compared with those from material isolated in the usual manner.

*Example 3*

320 parts of monohydrate are cooled to 15° C. and there are added 12 parts of bromine and 10 parts of sulfuryl chloride. The temperature is held at 15–20° C. while 16 parts of dimethoxy-dibenzanthrone are dissolved in the suspension. The charge is now heated to 25–30° C. under good agitation and is held at this temperature for a period of 16–24 hours. It is cooled to 15° C. and there are added slowly 6 parts of cyclohexanol. The excess bromine reacts very rapidly and is quantitatively consumed within a short time. When this reaction is complete, the charge is diluted slowly in 1500 parts of ice and water in such a manner that the temperature does not rise above 5° C. The resulting suspension is stirred one hour and is then filtered and the residue washed free from acid with cold water.

The residue may be converted directly to a dye paste. It yields dyeings of superior brightness and fastness to acids.

*Example 4*

3.75 parts of bromine and 3.0 parts of sulfuryl chloride are added to 100 parts of monohydrate which have been previously cooled to 15° C. 5.0 parts of dimethoxy-dibenzanthrone are dissolved in the resulting suspension without allowing the temperature to exceed 20° C. When the dyestuff is in solution, 2.5 parts of boric acid are slowly added at 15–20° C. The charge is stirred one hour and is then heated to 25–30° C. It is held within these limits and under strong agitation during a period of 15–25 hours. After cooling the charge to 15–20° C. there are added 1.5 parts of hydroquinone. The excess bromine disappears rapidly and, after a short time, the charge may be diluted in ice and water. The product upon isolation in the usual manner is in suitable condition to be used as a dyestuff. It yields dyeings of superior shade and fastness to acids.

It is to be understood that our invention is not limited to the use of the particular reagents listed above, but contemplates the use of any compound capable of readily and completely absorbing bromine in strong or dilute sulfuric acid solution.

The temperature at the time of diluting should be kept preferably below about 30° C., for at higher temperatures the tendency toward demethylation is increased.

The present invention eliminates tedious purification of the brominated dimethoxy-dibenzanthrone and gives a product that is greatly improved in purity over those heretofore obtained upon direct isolation of the product from the bromination mass.

We claim:

1. In the preparation of a brominated dimethoxy-dibenzanthrone wherein the bromination is carried out in concentrated sulfuric acid, the step which comprises neutralizing any free bromine contained in the solution at least as soon as the sulfuric acid solution becomes diluted with water.

2. In the preparation of a brominated dimethoxy-dibenzanthrone wherein the bromination is carried out in concentrated sulfuric acid, the step which comprises neutralizing any free bromine contained in the sulfuric acid solution before diluting with water.

3. In the preparation of a brominated dimethoxy-dibenzanthrone wherein the bromination is carried out in concentrated sulfuric acid, the step which comprises diluting the sulfuric acid solution in a water solution containing a bromine neutralizing agent.

4. In the preparation of a brominated dimethoxy-dibenzanthrone wherein the bromination is carried out in concentrated sulfuric acid, the step which comprises adding phenol to the sulfuric acid solution in an amount sufficient to neutralize the free bromine prior to diluting the mass to precipitate the dyestuff.

5. In the preparation of a brominated dimethoxy-dibenzanthrone wherein the bromination is carried out in concentrated sulfuric acid, the step which comprises diluting the sulfuric acid solution in a water solution containing an alkali metal bisulfite.

6. The process for preparing a brominated dimethoxy-dibenzanthrone which comprises dissolving dimethoxy-dibenzanthrone in concentrated sulfuric acid and reacting it with bromine in the presence of sulfuryl chloride and boric acid until bromination is complete, while maintaining a temperature of not above 30° C., adding sufficient phenol to the solution to completely neutralize any free bromine present and precipitating the dyestuff by diluting the mass with water.

WILLIAM L. RINTELMAN.
WILLIAM H. LYCAN.